(12) United States Patent
Harmsen et al.

(10) Patent No.: US 10,746,115 B2
(45) Date of Patent: Aug. 18, 2020

(54) METHODS AND SYSTEMS FOR AN EXHAUST GAS TREATMENT ARRANGEMENT

(71) Applicant: Ford Global Technologies, LLC, Dearborn, MI (US)

(72) Inventors: Jan Harmsen, Simpelveld (NL); Maria Armiento, Aachen (DE); Mario Balenovic, Waalre (NL); Robert Ukropec, Herzogenrath (DE); Christian Nederlof, Voerendaal (NL)

(73) Assignee: Ford Global Technologies, LLC, Dearborn, MI (US)

( * ) Notice: Subject to any disclaimer, the term of this patent is extended or adjusted under 35 U.S.C. 154(b) by 3 days.

(21) Appl. No.: 16/268,100

(22) Filed: Feb. 5, 2019

(65) Prior Publication Data

US 2019/0242314 A1     Aug. 8, 2019

(30) Foreign Application Priority Data

Feb. 7, 2018   (DE) ........................ 10 2018 201 869

(51) Int. Cl.
*F02D 41/02*   (2006.01)
*F01N 3/08*    (2006.01)
(Continued)

(52) U.S. Cl.
CPC ....... *F02D 41/0295* (2013.01); *F01N 3/0814* (2013.01); *F01N 3/0842* (2013.01); *F01N 3/0864* (2013.01); *F01N 3/0871* (2013.01); *F01N 3/0885* (2013.01); *F01N 3/2066* (2013.01); *F01N 9/00* (2013.01);
(Continued)

(58) Field of Classification Search
CPC .................................................. F02D 41/0295
See application file for complete search history.

(56) References Cited

U.S. PATENT DOCUMENTS 6,499,294 B1 * 12/2002 Katoh ................ B01D 53/9431
                                                        502/304
6,755,015 B1 *  6/2004 Manaka ................ F01N 3/0814
                                                        422/171
(Continued)

FOREIGN PATENT DOCUMENTS

DE   102015208093 A1   11/2015
DE   102015200125 A1   7/2016
DE   102015201902 A1   8/2016

OTHER PUBLICATIONS

Huang, Y. et al., "Deactivation of Cu/Zeolite SCR Catalyst Due to Reductive Hydrothermal Aging," Proceedings of the 2008 SAE World Congress & Exhibition, Apr. 14, 2008, Detroit, Michigan, 7 pages.

(Continued)

*Primary Examiner* — Kevin R Steckbauer
(74) *Attorney, Agent, or Firm* — Geoffrey Brumbaugh; McCoy Russell LLP

(57) ABSTRACT

Methods and systems are provided for an exhaust aftertreatment arrangement. In one example, a system includes a LNT upstream of an SCR with an oxygen storage component arranged therebetween, and where a rich operation of an engine is limited based on an oxygen load of the oxygen storage component when an exhaust gas temperature is higher than a limit temperature.

20 Claims, 6 Drawing Sheets

(51) Int. Cl.
*F01N 3/20* (2006.01)
*F02D 41/14* (2006.01)
*F01N 13/00* (2010.01)
*F01N 9/00* (2006.01)

(52) U.S. Cl.
CPC ....... *F01N 13/009* (2014.06); *F02D 41/0275* (2013.01); *F02D 41/1446* (2013.01); *F02D 41/1454* (2013.01); *F02D 41/1475* (2013.01); *F01N 2250/12* (2013.01); *F01N 2430/06* (2013.01); *F01N 2560/025* (2013.01); *F01N 2560/06* (2013.01); *F01N 2560/14* (2013.01); *F01N 2570/14* (2013.01); *F01N 2570/16* (2013.01); *F01N 2900/08* (2013.01); *F01N 2900/1402* (2013.01); *F01N 2900/1404* (2013.01); *F01N 2900/1624* (2013.01); *F02D 2200/0802* (2013.01); *F02D 2200/0806* (2013.01); *F02D 2200/0814* (2013.01); *F02D 2200/0816* (2013.01); *F02D 2250/36* (2013.01)

(56) References Cited

U.S. PATENT DOCUMENTS

| | | | | |
|---|---|---|---|---|
| 6,782,694 | B2 * | 8/2004 | Nakagawa | F01N 3/0814 60/274 |
| 7,461,628 | B2 * | 12/2008 | Blumberg | F02B 11/00 123/304 |
| 7,490,464 | B2 | 2/2009 | Li et al. | |
| 7,735,313 | B2 * | 6/2010 | Osumi | B01D 53/9409 60/274 |
| 8,196,391 | B2 | 6/2012 | Theis | |
| 8,776,498 | B2 | 7/2014 | Gandhi et al. | |
| 8,944,037 | B2 * | 2/2015 | Yonekawa | F02D 41/1441 123/672 |
| 9,662,611 | B2 | 5/2017 | Wan et al. | |
| 10,019,854 | B1 * | 7/2018 | McQuillen | F02D 41/18 |
| 10,072,545 | B2 * | 9/2018 | Hirooka | F02D 41/146 |
| 10,563,556 | B2 * | 2/2020 | Armiento | F01N 9/00 |
| 2003/0136113 | A1 * | 7/2003 | Nakagawa | F01N 3/0814 60/285 |
| 2008/0053071 | A1 | 3/2008 | Adams et al. | |
| 2008/0127933 | A1 * | 6/2008 | Blumberg | F02B 11/00 123/304 |
| 2008/0148715 | A1 * | 6/2008 | Osumi | B01D 53/9409 60/295 |
| 2010/0242934 | A1 * | 9/2010 | Yonekawa | F02D 41/0295 123/672 |
| 2012/0023913 | A1 * | 2/2012 | Yoshioka | F01N 11/002 60/285 |
| 2015/0337709 | A1 | 11/2015 | Choi | |
| 2019/0136737 | A1 * | 5/2019 | Umezawa | F01N 13/009 |
| 2019/0242285 | A1 * | 8/2019 | Armiento | B01D 53/9431 |
| 2019/0271251 | A1 * | 9/2019 | Ukropec | B01D 53/9495 |

OTHER PUBLICATIONS

Wang, J. et al., "Effect of aging on NOx reduction in coupled LNT-SCR systems," Applied Catalysis B: Environmental, vol. 148-149, Apr. 27, 2014, Available Online Oct. 25, 2013, 11 pages.

* cited by examiner

METHODS AND SYSTEMS FOR AN EXHAUST GAS TREATMENT ARRANGEMENT

CROSS REFERENCE TO RELATED APPLICATION

The present application claims priority to German Patent Application No. 102018201869.3, filed Feb. 7, 2018. The entire contents of the above-listed application are hereby incorporated by reference for all purposes.

FIELD

The present description relates generally to adjusting operating parameters during a rich operation of an engine.

BACKGROUND/SUMMARY

Reduction of $NO_x$ is of increasing concern as emission guidelines become more stringent. Types of emission treatments may include nitrogen oxide storage catalysts, also known as NSR catalysts, (e.g., $NO_x$ storage and reduction catalyst) or a lean $NO_x$ trap (LNT) may represent two exemplary aftertreatment devices for the catalytic conversion of nitrogen oxides. An alternative technology may include a selective catalytic reduction (SCR) device, which may utilize a reductant solution applied thereon to reduce nitrogen oxides.

LNT catalysts may store nitrogen oxides at temperatures below a threshold, wherein the nitrogen oxides stored thereon may be reduced in the presence of a rich air/fuel mixture. The hydrocarbons and carbon monoxide may function as reducing agents. Contrastingly, the SCR device may increase reduction efficiency at temperatures above the threshold, resulting in the SCR and LNT working in tandem to treat nitrogen oxide emission at a greater range of exhaust gas temperatures.

Thus, to meet the more stringent emission guidelines, it may be desired to pair the LNT catalyst and the SCR device in an exhaust gas treatment arrangement to increase a temperature range in which the nitrogen oxides may be reduced. However, this may lead to problems. In one example, the rich mixture used to reduce nitrogen oxides captured by the LNT catalyst may leak through the LNT, wherein the rich exhaust gas mixture may reach the SCR device, which may decrease a longevity of the SCR device.

Other attempts to address rich ageing of the SCR catalyst include arranging an air supply device upstream of the SCR. One example approach is shown by Gandhi et al. in U.S. Pat. No. 8,776,498. Therein, an air injection system and an oxygen storage capacity (OSC) device are arranged between a LNT and an SCR catalyst, wherein the air injection system and OSC work in tandem to decrease exposure of the SCR catalyst to rich exhaust gas.

However, the inventors herein have recognized potential issues with such systems. As one example, the air injection system may increase packaging constraints and may decrease fuel economy. Furthermore, OSC have a limited capacity, wherein once the OSC is depleted of oxygen the exhaust gas mixture upstream of the SCR catalyst may return to a rich mixture, thereby degrading the SCR device.

In one example, the issues described above may be addressed by a system comprising an exhaust passage comprising a lean-$NO_x$ trap (LNT) arranged upstream of a selective-catalytic-reduction (SCR) catalyst with respect to a direction of exhaust gas flow, an oxygen storage component arranged between the LNT and the SCR, and a controller with computer-readable instructions stored thereon that when executed enable the controller to limit a rich operation of an engine in response to an exhaust temperature and an oxygen load of the oxygen storage component. In this way, the rich ageing of the SCR in the presence of hot exhaust gas may be preempted.

As one example, the rich operation is limited in response to the exhaust gas temperature being higher than a limit temperature. If the exhaust gas temperature is less than the limit temperature, then the exhaust gas may not be hot enough to degrade the SCR, even if the exhaust gas is rich. As such, a rich operation which further includes an exhaust gas temperature less than the limit temperature may not be limited based on the oxygen load of the oxygen storage component. Additionally, feedback from one or more sensors arranged between the LNT and the SCR may be ignored, which may increase fuel economy.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
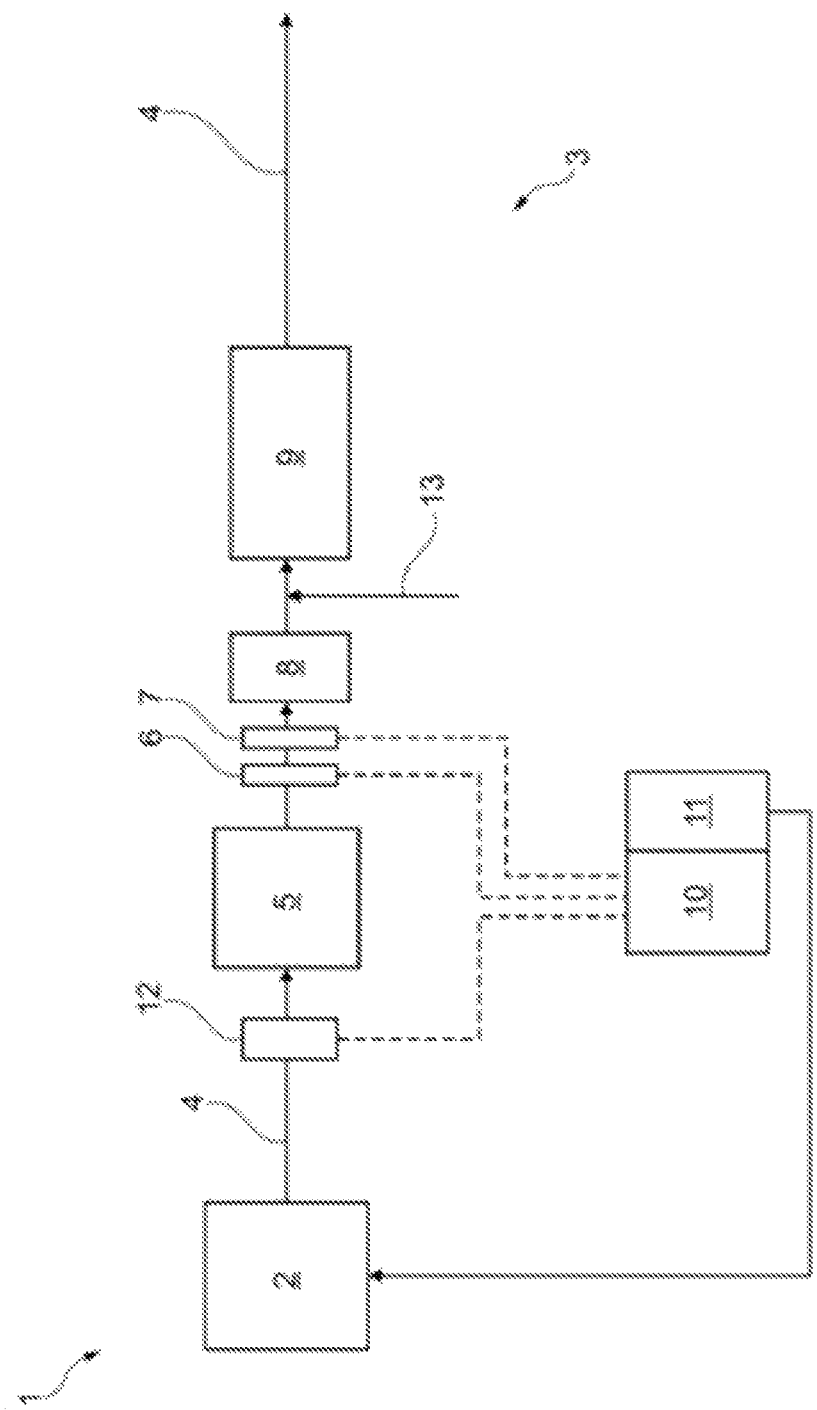
FIG. 1 illustrates a schematic of an exemplary exhaust gas arrangement with an internal combustion engine.
Figure 4:
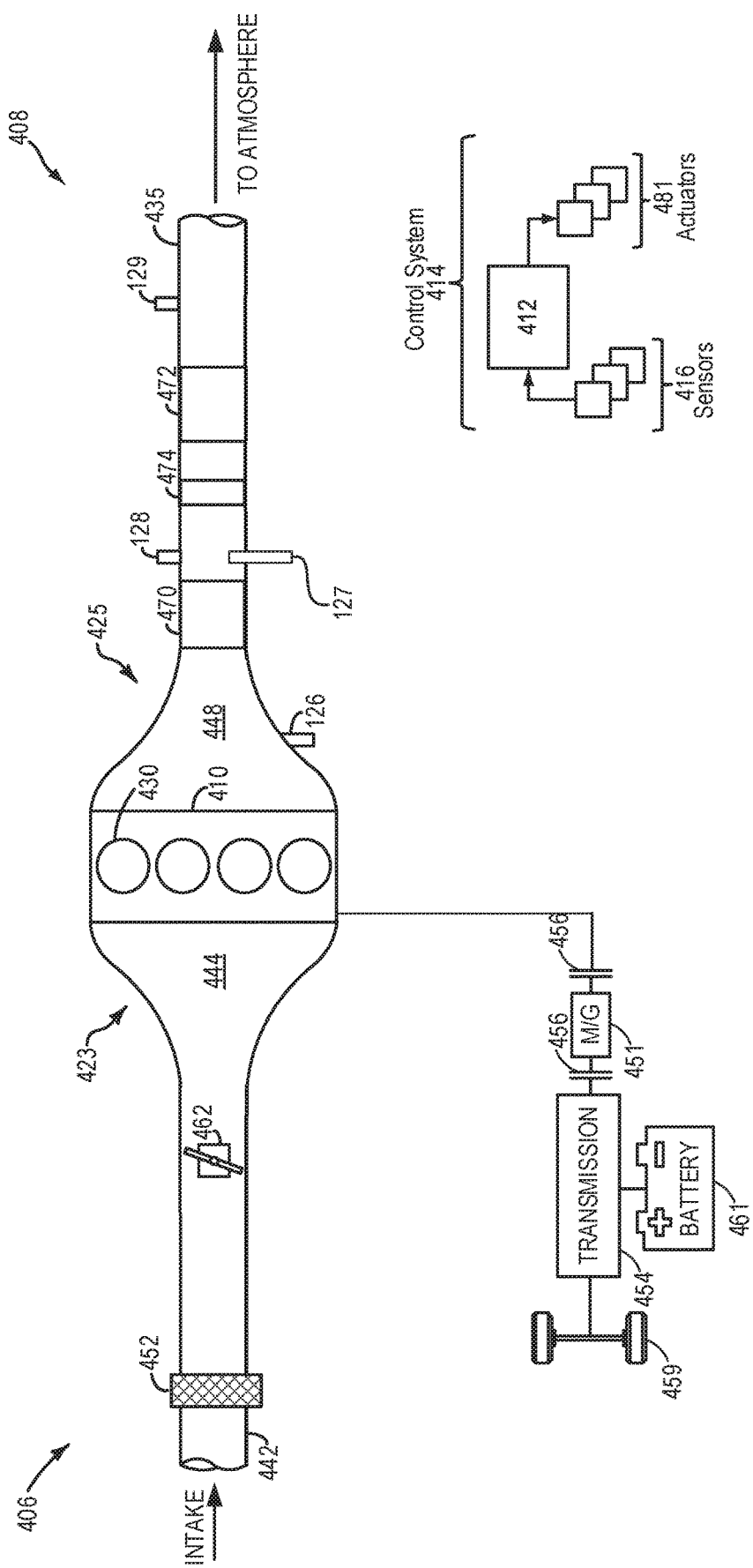
FIG. 4 illustrates a schematic of a hybrid vehicle comprising an engine fluidly coupled to an exhaust gas treatment arrangement having an oxygen storage component arranged between a first aftertreatment device and a second aftertreatment device.

The following description relates to systems and methods for adjusting engine operating parameters to mitigate degradation of an SCR catalyst. The SCR catalyst, which is arranged downstream of a LNT relative to a direction of exhaust gas flow as shown in FIGS. 1 and 4, may come into contact with rich exhaust gas during rich operating conditions of an engine. In one example, regeneration of the LNT may include rich exhaust gas, wherein exhaust gas temperatures may increase during the regeneration. If the exhaust gas temperatures increase to a temperature higher than a limit temperature, then the rich exhaust gas may degrade the SCR.

Figure 2:
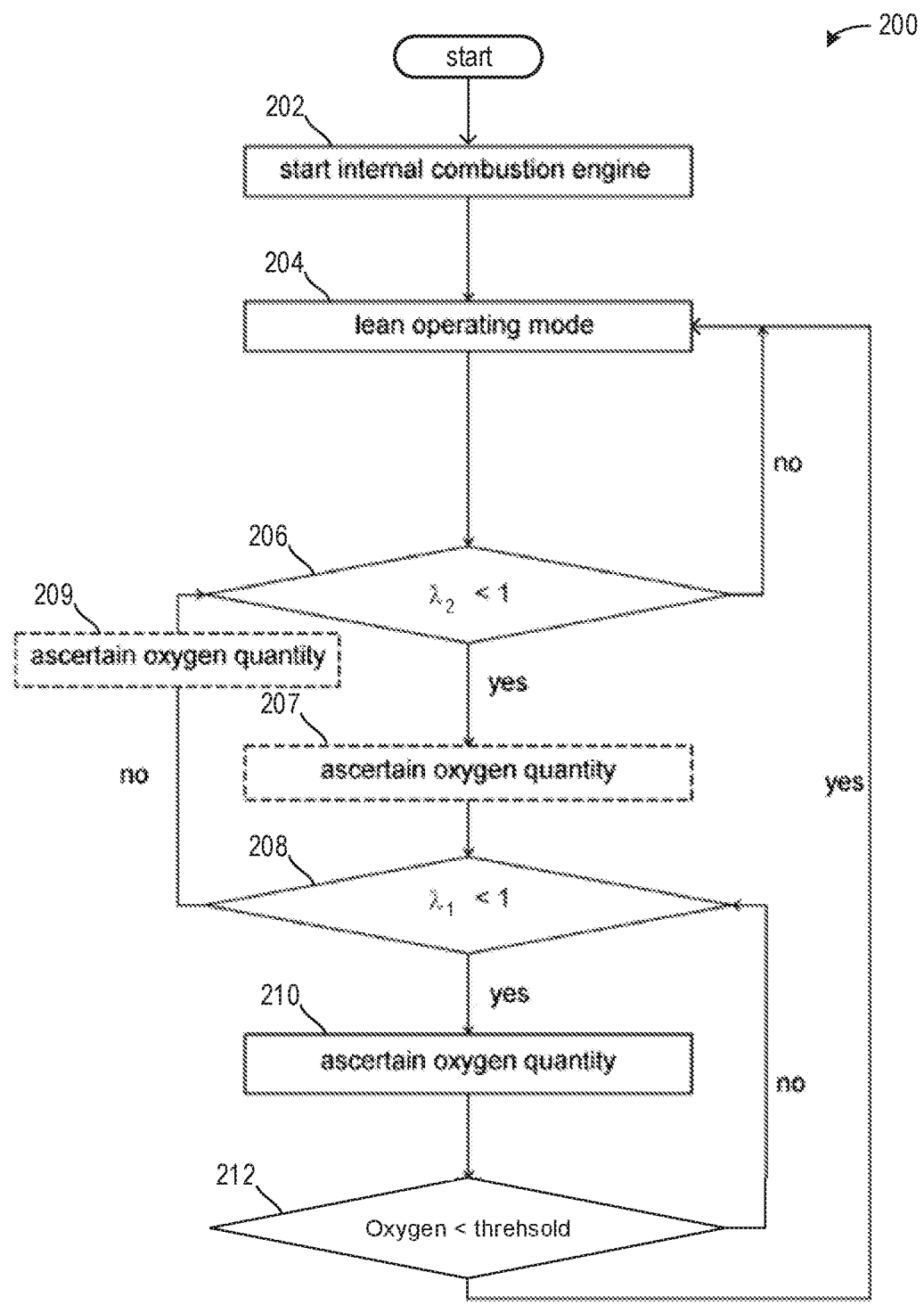
FIG. 2 illustrates a flow chart of a method for treating an exhaust gas.
Figure 5:
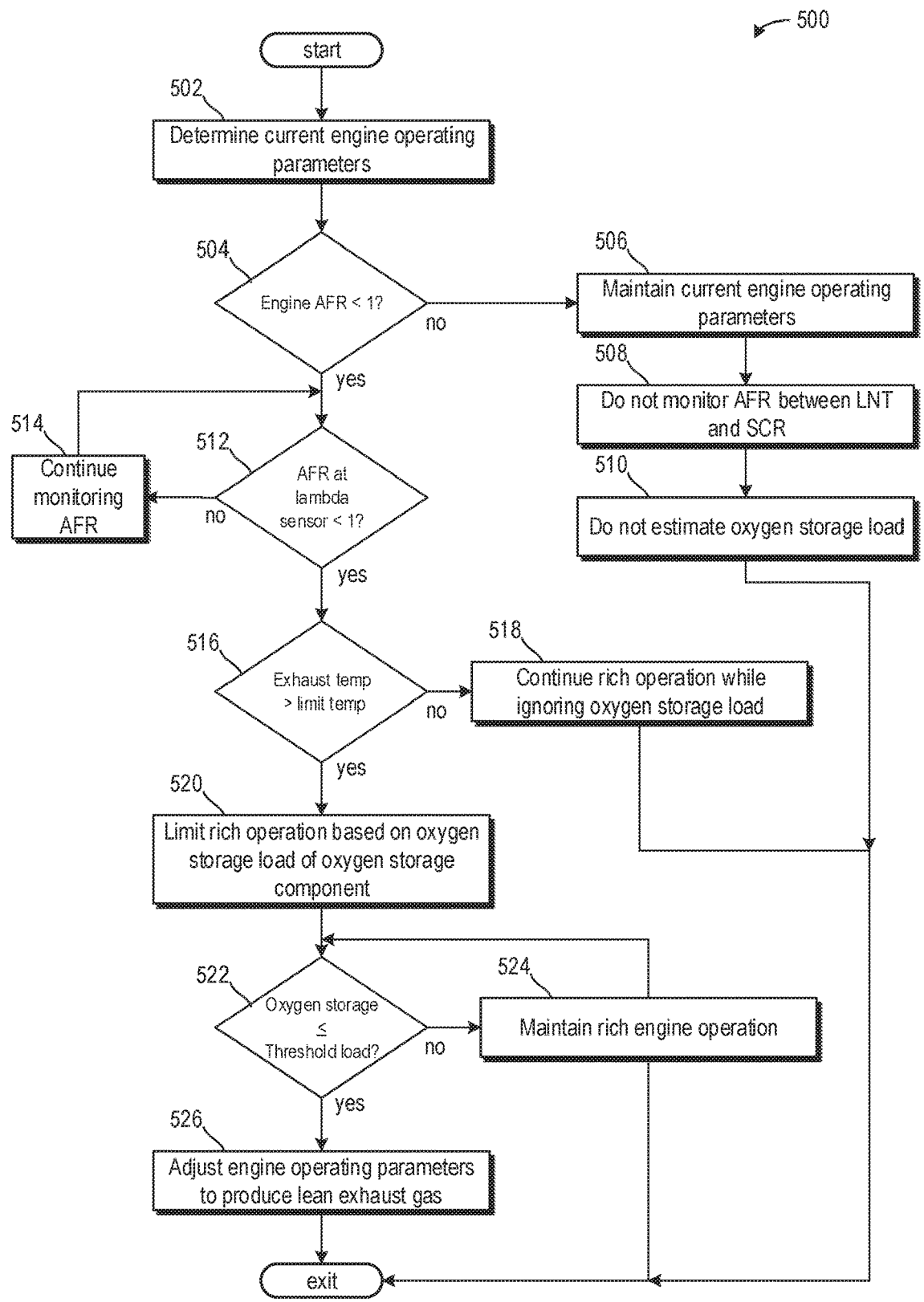
FIG. 5 illustrates a method for adjusting rich operation of the engine in response to one or more conditions regarding the exhaust gas treatment arrangement.

An oxygen storage component arranged between the LNT and the SCR may dilute the rich exhaust gas with oxygen such that stoichiometric or lean exhaust gas reaches the SCR, despite the exhaust gas directly downstream of the LNT being rich. In this way, the rich operation may be limited based on an oxygen load of the oxygen storage component. Methods for adjusting a duration of the rich operation in response to the oxygen load of the oxygen storage component are illustrated in FIGS. 2 and 5. The methods further illustrate operating instructions for rich operating conditions where the exhaust gas temperature is less than the limit temperature.

Figure 3:
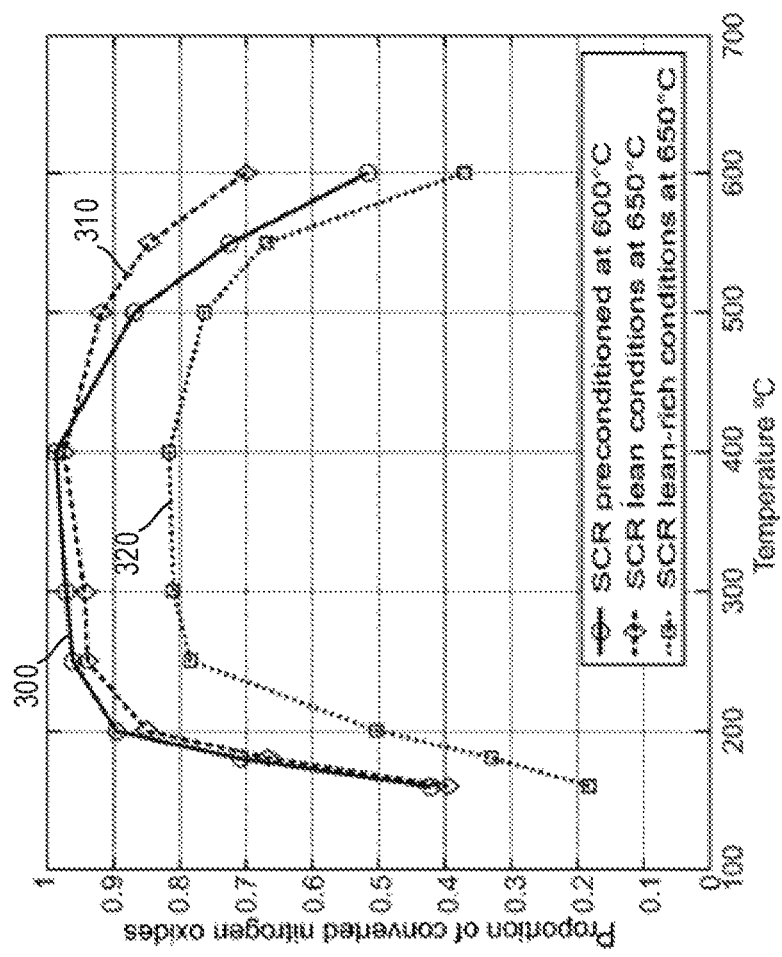
FIG. 3 illustrates the dependence of converted nitrogen oxide content on a temperature of different SCR catalysts.
Figure 6:
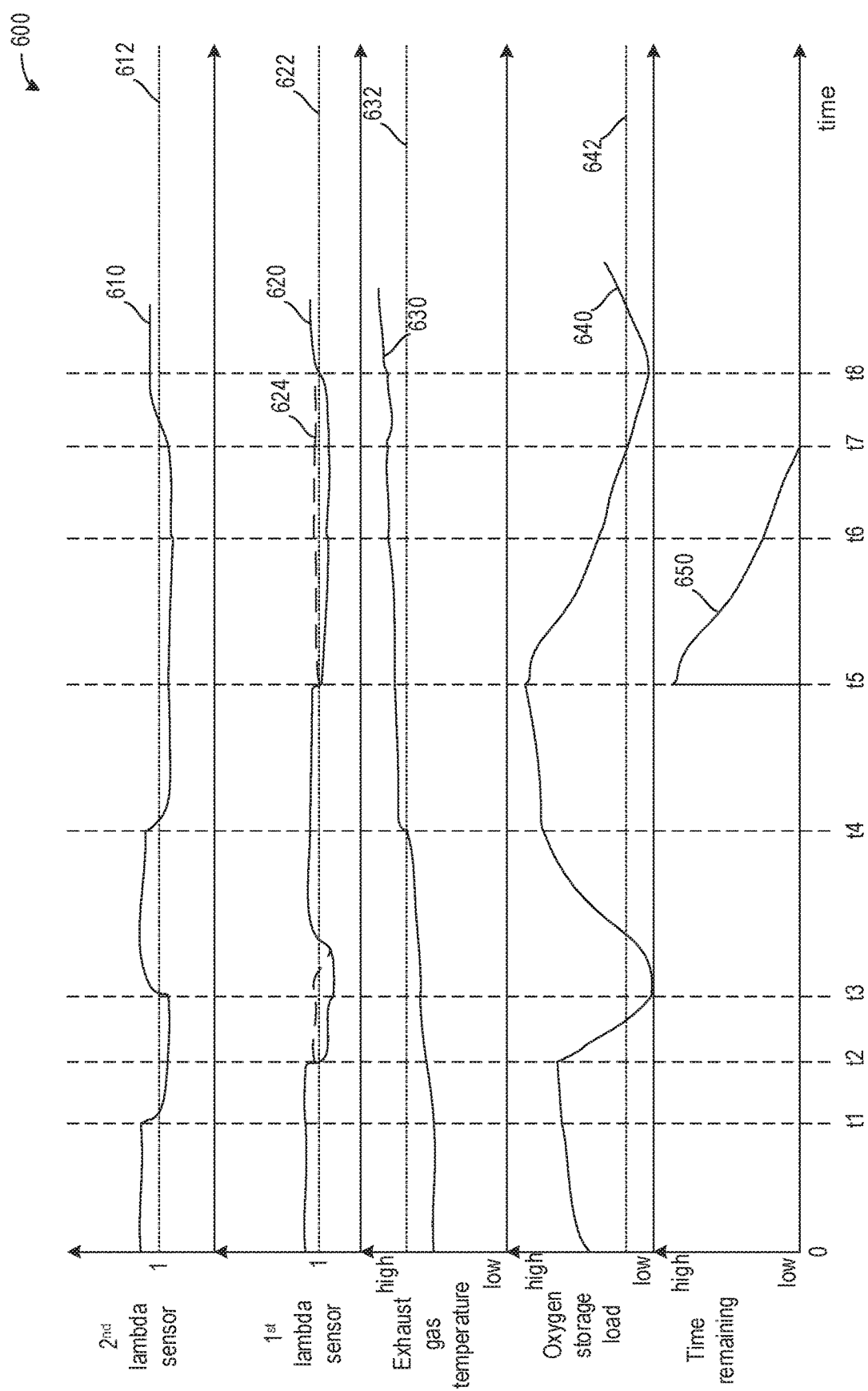
FIG. 6 illustrates an engine operating sequence graphically depicting adjustments to a rich engine operating condition based on an exhaust gas temperature and an oxygen load of an oxygen storage component.

FIG. 3 shows an efficiency of the SCR under various exhaust gas conditions. FIG. 6 illustrates a prophetic example of adjusting an engine operation in response to feedback from a first lambda sensor, a second lambda sensor, and a temperature sensor.

In one embodiment of the present disclosure, the reduction of nitrogen oxides ($NO_x$) in the exhaust gas stream of lean-burn engines, (e.g., internal combustion engines which are operated using a lean air-fuel mixture having a combustion air ratio $\lambda>1$), in an environment which is oxidative when considered as a whole represents a challenge under various operating conditions.

Nitrogen oxide storage catalytic converters, also called NSR catalytic converters ($NO_x$ storage and reduction catalyst) or LNT catalytic converters (lean $NO_x$ trap), represent one of the two main technologies for the catalytic conversion of nitrogen oxides. An alternative technology is based on the selective catalytic reduction (SCR) of nitrogen oxides via nitrogenous reducing agents, for example, ammonia, which can be obtained, for example, from a supplied urea solution.

LNT catalytic converters can already store nitrogen oxides at low temperatures and the storage efficiency increases up to temperatures of approximately 200 to 250° C. The adsorbed, (e.g., stored) nitrogen oxides can then be reduced to form nitrogen, by the LNT catalytic converter being flushed using a rich mixture at higher temperatures. Components contained in the rich mixture, for example, hydrocarbons, carbon monoxide, and/or hydrogen, act as the reducing agents in this case.

The SCR catalyst, in contrast, may have low reaction speeds for the reduction of nitrogen oxides at low temperatures, if an optimum $NO:NO_2$ ratio is not present and the availability of ammonia is not sufficient to promote a rapid reaction. However, once the temperature exceeds 200° C., SCR catalytic converters display increased efficiency with respect to the nitrogen oxide conversion.

To meet stricter emission guidelines, a coupling of the two main technologies has become attractive and is described, for example, in DE 10 2015 208 093 A1. In this way, nitrogen oxides can be effectively converted in a much larger temperature range. The combination of an LNT catalytic converter with an SCR catalytic converter also faces drawbacks. While the SCR catalytic converter is configured for use with a lean exhaust gas mixture, (e.g., oxygen excess), the LNT catalytic converter at least temporarily demands a rich exhaust gas mixture for its regeneration, (e.g., the reduction of the stored nitrogen oxides and the emission of the reduced compounds in the exhaust gas stream) in order to reestablish the nitrogen oxide storage capacity. That is to say, the LNT is returned to a state following the regeneration configured to store more nitrogen oxides than a state prior to the regeneration.

The temporary operation using a rich exhaust gas mixture causes a reducing agent slip. In other words, the rich exhaust gas mixture also reaches the SCR catalytic converter arranged downstream of the LNT catalytic converter. This rich exhaust gas mixture can have a negative effect on the performance of the SCR catalytic converter, however.

The object of the present disclosure is therefore to reduce or avoid the disadvantageous effects of a rich exhaust gas mixture, for example, as is used for regenerating an LNT catalytic converter, on the SCR catalytic converter.

The disclosure is at least partially based on the findings of the inventors that in particular at high temperatures, for example, as prevail during the desulfurization (DeSOx), the contact of a rich exhaust gas mixture with the SCR catalytic converter has a negative effect on its performance. This impairment of the performance of the SCR catalytic converter may be irreversible and is based on a deactivation of the catalyst material, for example, as a result of sintering procedures, and/or the reduction of copper in the SCR catalytic converter.

Such an irreversible impairment of the performance of the SCR catalytic converter is moreover difficult to predict and accordingly can only be taken into consideration inadequately in the prediction of the optimum quantity to be externally supplied of reducing agent, for example, urea solution. If the performance of the SCR catalytic converter has been reduced as a result of the contact with a rich exhaust gas mixture, however, but the same quantity of urea solution is still supplied, an undesired release of ammonia takes place.

The basic concept of the disclosure is to protect the SCR catalytic converter from a rich exhaust gas mixture by arranging an oxygen storage component (OSC, oxygen storage capacity) downstream of the LNT catalytic converter. Rich components breaking through the LNT catalytic converter, for example, hydrocarbons, carbon monoxide, ammonia, etc., can react with oxygen stored in the oxygen storage component, and therefore the combustion air ratio $\lambda$ rises to $\lambda \geq 1$, (e.g., a stoichiometric or lean exhaust gas mixture) from a $\lambda<1$.

In this way, a rich exhaust gas mixture does not reach the SCR catalytic converter and degradation to the SCR catalytic converter can be avoided.

LNT and SCR catalytic converters can therefore jointly be used continuously for the catalytic treatment of the exhaust gas stream. This enables an effective catalytic treatment of the exhaust gas stream within a large temperature range, and therefore nitrogen oxides contained in the exhaust gas stream can be substantially removed and the SCR catalytic converter can simultaneously be protected from irreversible degradation and worsening of its catalytic activity accompanying this.

An arrangement according to the disclosure has an internal combustion engine producing an exhaust gas stream and an exhaust system connected to the internal combustion engine for receiving the exhaust gas stream. The exhaust system has an LNT catalytic converter, a first lambda sensor arranged downstream of the LNT catalytic converter, a temperature sensor arranged downstream of the LNT catalytic converter, an oxygen storage component arranged downstream of the first lambda sensor and downstream of the temperature sensor, and an SCR catalytic converter arranged downstream of the oxygen storage component.

An internal combustion engine, sometimes also referred to as a combustion engine, is to be understood as an internal combustion engine for converting chemical energy contained in the fuel into mechanical work. The internal combustion engine can be configured, for example, as a self-ignition or external-ignition internal combustion engine. Gasoline or diesel can be used as the fuel, for example. Specified flow directions relate to the flow direction of the exhaust gas stream from the internal combustion engine in the direction of the exhaust pipe.

The exhaust system is formed by an exhaust line, through which the exhaust gas stream flows and in which the exhaust gas treatment devices and sensors are arranged, and therefore the exhaust gas stream also can flow through the exhaust gas treatment devices and the properties of the exhaust gas stream, for example, its composition, temperature, etc., can be determined via the sensors. Reference is made to the introductory explanations on the definition and functionality of an LNT or SCR catalytic converter, respectively.

A first lambda sensor is arranged downstream of the LNT catalytic converter and upstream of the oxygen storage component and thus also upstream of the SCR catalytic converter. A lambda sensor is to be understood as a sensor which supplies measurement signals, from which the combustion air ratio λ, (e.g., the ratio of the air mass actually available for the combustion to the minimum stoichiometric air mass which is used for complete combustion), is ascertained. The lambda sensor can be configured, for example, as a lambda probe, which compares the residual oxygen content in the exhaust gas to the oxygen content of the present atmospheric air, from which the combustion air ratio can be ascertained. The lambda sensor can also be designed as a nitrogen oxide sensor, since such nitrogen oxide sensors can also output the combustion air ratio in addition to the determination of the nitrogen oxide proportion.

The combustion air ratio downstream of the LNT catalytic converter can be ascertained via the first lambda sensor, (e.g., it can be determined whether the exhaust gas is a rich exhaust gas mixture ($\lambda_1<1$)), a stoichiometric exhaust gas mixture ($\lambda_1=1$), or a lean exhaust gas mixture ($\lambda_1>1$) after flowing through the LNT catalytic converter. If a rich exhaust gas mixture is supplied to the LNT catalytic converter for regeneration, the point in time can be determined via the first lambda sensor at which a regeneration of the LNT catalytic converter can be presumed, since a rich exhaust gas mixture can also be detected downstream at this point in time. This point in time is also referred to as the lambda breakthrough.

The exhaust system furthermore has an oxygen storage component for storing oxygen. The stored oxygen is capable of reacting with rich components, (e.g., those having a reducing action), of the exhaust gas stream and oxidizing them. If stored oxygen is present, the combustion air ratio increases downstream of the oxygen storage component, and therefore a combustion air ratio $\lambda \geq 1$, (e.g., a stoichiometric or lean exhaust gas mixture), prevails downstream of the oxygen storage component.

The oxygen storage component can contain one or more compounds selected from a group comprising $CeO_2$, $PrO_2$, $ZrO_2$, $MnO_x$, $La_2O_3$, $NbO_x$, $VO_x$, $CrO_x$, $FeO_x$, $CuO$, $AgO_x$, Pt, and Pd. The oxygen storage component can have, for example, a mixture of $CeO_2$ and $ZrO_2$ or $CeO_2$, $PrO_2$ and $ZrO_2$ and/or $NbO_x$.

Furthermore, the exhaust system has a temperature sensor arranged downstream of the LNT catalytic converter and upstream of the oxygen storage component for determining the temperature of the exhaust gas stream upstream of the oxygen storage component. The temperature sensor can be arranged, for example, upstream or downstream of the first lambda sensor or at the same position in relation to the flow path of the exhaust gas stream.

It can be ascertained via the temperature sensor, for example, whether the temperature of the exhaust gas stream exceeds a limiting temperature, for example, a limiting temperature of 500° C.

The oxygen quantity presently (still) stored in the oxygen storage component can be determined on the basis of the sensor signals of the first lambda sensor and the temperature sensor. For this purpose, the exhaust system can have a processing unit, which is configured and designed to ascertain an oxygen quantity stored in the oxygen storage component via sensor signals of the lambda sensor and the temperature sensor.

Proceeding from a starting quantity of stored oxygen, which is present, for example, after flushing the oxygen storage component with oxygenated air or supplying a lean exhaust gas mixture for a sufficient duration, the reduction of the oxygen quantity can be determined as a function of the temperature, ascertained via the temperature sensor, and the quantity of supplied rich components to the oxygen storage component, ascertained via the first lambda sensor, and thus also the remaining oxygen quantity can be determined. Before beginning operation of the internal combustion engine in a rich operating mode, (e.g., using a rich air-fuel mixture), the quantity of stored oxygen is preferably full loaded, (e.g., the oxygen storage component is maximally charged with oxygen). In one example, consumption of oxygen stored in the oxygen storage component during rich conditions increases as the exhaust gas temperature increases.

As one example, the amount of oxygen stored in the oxygen storage component may be modelled as a function of temperature, space velocity, and exhaust gas air/fuel ratio upstream of the oxygen storage component. The model may predict a storage and a depletion of the oxygen storage component, thereby allowing the monitoring of the residual oxygen still remaining. For example, during a lean engine operating condition, the oxygen storage component may be refilled with oxygen, wherein the refilling may be tracked as a function of temperature. As another example, during a rich engine operating condition, the oxygen storage depletion may be estimated based on the exhaust gas air/fuel ratio and the space velocity to determine an amount of reductant (e.g., fuel) enter the oxygen storage component.

In other words, a model of the oxygen storage describes a speed or a rate of the oxygen reduction as a function of the combustion air ratio of the supplied exhaust gas stream and the temperature and also the capability of the oxygen storage component to keep the combustion air ratio downstream of the oxygen storage component at $\lambda \geq 1$, as a function of the presently stored oxygen quantity. The model can be designed as an online model.

It can then be decided as a function of the remaining oxygen quantity whether a rich exhaust gas mixture, for example, for regenerating the LNT catalytic converter, can furthermore be supplied to the exhaust system, (e.g., whether the oxygen quantity is sufficient for the oxidation of the rich components breaking through the LNT catalytic converter). If the oxygen quantity is no longer sufficient, the combustion air ratio of the exhaust gas stream leaving the internal combustion engine, (e.g., the combustion air ratio upstream of the LNT catalytic converter), can thus be controlled such that it is stoichiometric or lean. If sufficient oxygen is again stored in the oxygen storage component, a rich exhaust gas mixture can thus again be supplied to the exhaust system.

Moreover, the temperature can be taken into consideration to decide whether a rich exhaust gas mixture can furthermore be supplied to the exhaust system or whether a lean exhaust gas mixture is demanded in order to supply oxygen for storage to the oxygen storage component. For example, at low temperatures below the limit temperature, for example, temperatures of less than 500° C., the supply of a lean exhaust gas mixture can be ended, since in this case irreversible damage of the SCR catalytic converter is not to be expected.

The determination of the temperature and the combustion air ratio downstream of the LNT catalytic converter can take place continuously, and therefore the determination of the remaining oxygen quantity in the oxygen storage component can also take place continuously, for example, with the aid of an online model, for example, the above-described model.

Permanent degradation of the catalyst activity of the SCR catalytic converter due to contact with a rich exhaust gas mixture, in particular at high temperatures, can be avoided according to the disclosure. The efficiency of the SCR catalytic converter during the removal of nitrogen oxides from the exhaust gas stream can be maintained over a longer period of time. In addition, the SCR catalytic converter can be monitored more precisely, for example, to determine a correct quantity of urea solution to be supplied and to mitigate an undesired emission of excess ammonia, since a restriction of the catalyst activity otherwise to be taken into consideration as a result of the contact with a rich exhaust gas mixture is avoided. In other words, the prediction of the desired quantity of urea solution corresponds better with the actual desired quantity.

According to further embodiment variants, the exhaust system can furthermore have a control unit, which is configured and designed to output a control signal for controlling the combustion air ratio $\lambda M$ of the exhaust gas stream leaving the internal combustion engine as a function of the stored oxygen quantity in the oxygen storage component.

For example, the combustion air ratio $\lambda M$ of the exhaust gas stream leaving the internal combustion engine can be controlled such that the exhaust gas stream has a combustion air ratio $\lambda M \geq 1$ if the ascertained oxygen quantity falls below a limiting value. If the determined oxygen quantity reaches or exceeds the limiting value, in contrast, if sufficient oxygen is thus still stored in the oxygen storage component, the exhaust gas stream leaving the internal combustion engine can also be controlled such that the exhaust gas stream has a combustion air ratio $\lambda M < 1$, for example, if the LNT catalytic converter desires a rich exhaust gas mixture for its regeneration.

The combustion air ratio $\lambda M$ of the exhaust gas stream leaving the internal combustion engine can be controlled by controlling the composition of the air-fuel mixture supplied to the combustion chamber of the internal combustion engine. If, for example, a lean air-fuel mixture is supplied to the combustion chamber of the internal combustion engine, it can thus be presumed that the exhaust gas stream leaving the internal combustion engine has a lean exhaust gas mixture.

If no further devices, for example, further exhaust gas post-treatment devices are provided in the exhaust system between internal combustion engine and LNT catalytic converter, the combustion air ratio $\lambda M$ of the exhaust gas stream leaving the internal combustion engine corresponds to the combustion air ratio $\lambda$ upstream of the LNT catalytic converter.

The control unit can optionally be configured as a control and regulating unit and can furthermore optionally form a common control and processing unit with the processing unit. The control unit can also be designed as part of an engine control device.

According to various embodiment variants, it can moreover be provided that the control unit additionally outputs the control signal for controlling the combustion air ratio $\lambda M$ of the exhaust gas stream leaving the internal combustion engine as a function of the temperature of the exhaust gas stream.

For example, the control signal for controlling the combustion air ratio $\lambda M$ cannot be output already upon falling below the limiting value for the oxygen quantity, but rather only if the temperature of the exhaust gas stream also exceeds a limit temperature. If the limiting temperature is not exceeded, $\lambda M < 1$ can still apply.

A contact of the SCR catalytic converter with a rich exhaust gas mixture can thus advantageously be avoided at high temperatures, (e.g., those exceeding the limit temperature), and thus irreversible damage can be avoided, while at lower temperatures, for example, a regeneration of the LNT catalytic converter via a rich exhaust gas mixture can still be performed, and therefore the exhaust gas post-treatment of the LNT catalytic converter is negatively influenced as little as possible.

According to various embodiment variants, the exhaust system can furthermore have a second lambda sensor arranged upstream of the LNT catalytic converter.

This second lambda sensor is also used to ascertain the combustion air ratio and can be designed, for example, as a lambda probe like the first lambda sensor. If a combustion air ratio $\lambda_2 < 1$ is detected upstream of the LNT catalytic converter via the second lambda sensor, a rich exhaust gas mixture is supplied to the exhaust system, for example, to regenerate the LNT catalytic converter. It is to be expected that after a certain time span, a combustion air ratio $\lambda_1 < 1$ will also be detected downstream of the LNT catalytic converter, (e.g., via the first lambda sensor). This time span may correspond to a transport delay (e.g., a time needed for exhaust gas from the engine to reach the first lambda sensor).

The sensor signal of the second lambda sensor can be used as a precondition for carrying out further method steps. For example, solely for the case that a combustion air ratio $\lambda_2 < 1$ is detected upstream of the LNT catalytic converter, a combustion air ratio $\lambda_1 < 1$ can also be detected downstream of the LNT catalytic converter. A registration and analysis of the sensor signals of the first lambda sensor and also of the temperature sensor to determine the stored oxygen quantity can therefore be omitted if a combustion air ratio $\lambda_2 < 1$ is not detected upstream of the LNT catalytic converter. Resources desired for ascertaining and analyzing the sensor signals can thus be preserved. The processing unit can optionally also be configured in addition to analyze the sensor signal of the second lambda sensor for this purpose.

According to various embodiment variants, the exhaust system can have a supply device for supplying an agent forming ammonia, for example, an aqueous urea solution, to the exhaust gas stream, which can be arranged, for example, downstream of the oxygen storage component and upstream of the SCR catalytic converter. A reaction of the agent forming ammonia with stored oxygen can advantageously be avoided by an arrangement downstream of the oxygen storage component.

Further exhaust gas post-treatment devices, for example, particle filters or further catalytic converters, can optionally be arranged in the exhaust system. In one embodiment variant, the exhaust system only has the above-described components (catalytic converters, sensors, units, etc.).

A motor vehicle according to the disclosure has an arrangement according to the above description. A motor vehicle is to be understood as a vehicle driven by an internal combustion engine, for example, a land, air, or water vehicle. The above statements to explain the arrangement according to the disclosure are thus also used to describe the motor vehicle according to the disclosure. The advantages of the motor vehicle according to the disclosure correspond to those of the arrangement according to the disclosure and the embodiment variants thereof.

A method according to the disclosure for the treatment of an exhaust gas stream produced by an internal combustion engine comprises conducting the exhaust gas stream through an LNT catalytic converter, ascertaining the combustion air ratio $\lambda_1$ in the exhaust gas stream downstream of the LNT catalytic converter and upstream of an oxygen storage component, ascertaining the temperature of the exhaust gas stream downstream of the LNT catalytic converter and upstream of the oxygen storage component, conducting the exhaust gas stream through the oxygen storage component, and conducting the exhaust gas stream through an SCR catalytic converter downstream of the oxygen storage component.

The method according to the disclosure can be executed, for example, via the above-explained arrangement according to the disclosure. The above statements to explain the arrangement according to the disclosure are thus also used to describe the method according to the disclosure. The advantages of the method according to the disclosure correspond to those of the arrangement according to the disclosure and the corresponding embodiment variants thereof.

According to various embodiment variants, the method can furthermore comprise a determination of an oxygen quantity stored in the oxygen storage component via the ascertained combustion air ratio $\lambda_1$ and the ascertained temperature.

According to further embodiment variants, the method can furthermore comprise a control of the combustion air ratio $\lambda M$ of the exhaust gas stream leaving the internal combustion engine as a function of the determined oxygen quantity. The combustion air ratio $\lambda M$ of the exhaust gas stream leaving the internal combustion engine can be controlled, for example, such that the exhaust gas stream has a combustion air ratio $\lambda M \geq 1$ if the determined oxygen quantity falls below a limiting value.

According to further embodiment variants, the combustion air ratio $\lambda M$ of the exhaust gas stream leaving the internal combustion engine can only be controlled such that the exhaust gas stream has a combustion air ratio $\lambda M \geq 1$ if the determined oxygen quantity falls below a limiting value and the temperature of the exhaust gas stream exceeds a limiting temperature.

According to further embodiment variants, the method can furthermore comprise a determination of the combustion air ratio $\lambda_2$ in the exhaust gas stream upstream of the LNT catalytic converter.

FIGS. 1 and 4 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

Turning now to FIG. 1, it schematically shows an arrangement 1 having an internal combustion engine 2 and an exhaust system 3 adjoining the internal combustion engine 2. The internal combustion engine 2 can be configured as a self-ignition engine and can be operated, for example, using diesel fuel. The internal combustion engine produces an exhaust gas stream 4, which is received by the exhaust system 3. Described in the flow direction of the exhaust gas stream 4, the exhaust system 3 comprises an LNT catalytic converter 5, a first lambda sensor 6, a temperature sensor 7, an oxygen storage component 8, and an SCR catalytic converter 9. The SCR catalytic converter can optionally also comprise a particle filter functionality and can be designed as an SDPF catalytic converter, (e.g., as a particle filter having SCR functionality). The oxygen storage component 8 comprises, for example, a mixture of $CeO_2$ and $ZrO_2$ or $CeO_2$, $PrO_2$, and $ZrO_2$ and/or $NbO_x$. It can optionally contain platinum and/or palladium.

In addition, the exhaust system 3 has a second lambda sensor 12, which is arranged upstream of the LNT catalytic converter 5. The first and second lambda sensors 6, 12 are configured as lambda probes. Both lambda sensors 6, 12 and the temperature sensor 7 are connected for signaling to the processing unit 10. The processing unit 10 can ascertain the oxygen quantity stored in the oxygen storage component 8 via the sensor signals of the first lambda sensor 6 and the temperature sensor 7.

The sensor signal of the second lambda sensor 12 can be used in order to decide whether the first lambda sensor 6 and the temperature sensor 7 supply sensor signals and whether these sensor signals are to be analyzed. If, for example, a combustion air ratio $\lambda_2$ of the second lambda sensor 12 is <1, the sensor signals of the first lambda sensor 6 and of the temperature sensor 7 may then be analyzed. If this is not the case (e.g., $\lambda_2 \geq 1$), a determination of the combustion air ratio $\lambda_1$ of the first lambda sensor and of the temperature of the exhaust gas stream 4 downstream of the LNT catalytic converter 5 can be omitted, since in this case a rich exhaust gas mixture is already not supplied to the LNT catalytic converter 5 and therefore a rich exhaust gas mixture also cannot reach the SCR catalytic converter 9.

The processing unit 10 is connected to the control unit 11, which, as a function of the processed control signals of the first lambda sensor 6 and the temperature sensor 7, (e.g., the determined oxygen quantity in the oxygen storage component 8), outputs a control signal to the internal combustion engine 2 to control the composition of the air-fuel mixture in the combustion chamber of the internal combustion engine 2 and thus to control the combustion air ratio λM of the exhaust gas stream 4 leaving the internal combustion engine 2. If the stored oxygen quantity falls below a limiting value, a sufficient oxidation of the rich components of the exhaust gas mixture before reaching the SCR catalytic converter 9 may not occur and rich exhaust gas may reach the SCR catalytic converter 9. In order to nonetheless block a rich exhaust gas mixture from reaching the SCR catalytic converter 9, the combustion air ratio λM of the exhaust gas stream 4 leaving the internal combustion engine 2 is controlled such that λM≥1 applies. Permanent damage to the SCR catalytic converter 9 due to contact with a rich exhaust gas mixture can thus be avoided.

A supply device 13 for an agent forming ammonia, for example, urea solution, to the exhaust gas stream 4 can be arranged between oxygen storage component 7 and SCR catalytic converter 9, and therefore the SCR catalytic converter 9 can contain the ammonia quantity necessary for converting the nitrogen oxides. Additionally, this arrangement may mitigate side reactions between the urea solution and oxygen from the oxygen storage component 7.

Further exhaust gas post-treatment devices can optionally be provided, for example, particle filters. There is also the possibility of recirculating a part of the exhaust gas stream 4 again, (e.g., supplying it mixed with fresh air as supply air to the internal combustion engine 2), known by those of ordinary skill in the art as exhaust gas recirculation (EGR).

Turning now to FIG. 2, it shows a flow chart of a method 200 for treating an exhaust gas stream 4 generated by an internal combustion engine 2. After the start of the internal combustion engine at 202, it is firstly operated in a lean operating mode at 204 using a lean air-fuel mixture.

The combustion air ratio $\lambda_2$ in the exhaust gas stream 4 upstream of the LNT catalytic converter 5 is determined via the second lambda sensor 12 at 206. If the combustion air ratio $\lambda_2$ is not less than 1, the lean operating mode is continued without further measures. Furthermore, feedback from the first lambda sensor 6 and the temperature sensor 7 may be ignored and/or not provided, which may increase fuel economy.

As needed, for example, to regenerate the LNT catalytic converter 5, the internal combustion engine 2 can be operated using a rich air-fuel mixture. In this case, the combustion air ratio of the exhaust gas stream λM leaving the internal combustion engine and thus also the combustion air ratio $\lambda_2$ upstream of the LNT catalytic converter is <1. If a combustion air ratio $\lambda_2<1$ is determined, the combustion air ratio $\lambda_1$ downstream of the LNT catalytic converter 5 is thus ascertained via the first lambda sensor 6 at 208.

The oxygen quantity stored in the oxygen storage component 8 can optionally be continuously ascertained (dashed box 207).

If a combustion air ratio $\lambda_1 \geq 1$ is determined, the combustion air ratio $\lambda_1$ is continuously monitored as long as the combustion air ratio $\lambda_2$ is also <1. The oxygen quantity stored in the oxygen storage component may be optionally estimated at dashed box 209. The combustion air ratio $\lambda_2$ may differ from the combustion air ratio $\lambda_1$ due to a transport delay of the rich exhaust gas reaching the location of the first lambda sensor. The rich operation may proceed uninterrupted during this time as rich exhaust gas is not flowing to the SCR catalyst. If a combustion air ratio $\lambda_1<1$ is determined, the oxygen quantity stored in the oxygen storage component 8 is ascertained at 210. For this purpose, the signals of the first lambda sensor 6 and of the temperature sensor 7 are analyzed.

The ascertained oxygen quantity is compared to a predefined limiting value and/or a threshold load. If the oxygen quantity corresponds to the limiting value or is greater than the limiting value, the oxygen quantity is ascertained continuously, for example, via an online model, as long as the combustion air ratio $\lambda_1$ is <1. However, if the oxygen quantity falls below the limiting value, the internal combustion engine 2 is operated using a lean air-fuel mixture. In this way, a rich exhaust gas mixture may not reach the SCR catalytic converter 9 and degrade it.

The internal combustion engine 2 can again be operated using a rich air-fuel mixture as soon as the oxygen storage component 8 is again sufficiently filled with oxygen. A sufficient oxygen filling can be presumed, for example, if the internal combustion engine 2 was operated for a specific duration using a lean air-fuel mixture. Excess oxygen can be absorbed and stored in this case by the oxygen storage component 8.

Turning now to FIG. 3, it shows the proportion of converted nitrogen oxides as a function of the temperature for SCR catalytic converters under various conditions. It can be seen that the proportions of converted nitrogen oxides for a fresh SCR catalytic converter, (e.g., line 300 representing preconditioned at 600° C.), and for an SCR catalytic converter subjected to lean conditions at 650° C. (e.g., line 310) are approximately equal.

In contrast, it is apparent from FIG. 3 that the proportion of converted nitrogen oxides is significantly reduced in an SCR catalytic converter which is alternately subjected to lean and rich conditions at 650° C. (e.g., line 320), which may correspond to an SCR catalytic converter without methods and arrangement described in the present disclosure to mitigate exposure of the SCR catalytic converter to hot, rich exhaust gases.

Due to the disclosure, the SCR catalytic converter 9 may not subjected to degrading rich conditions. The proportion of converted nitrogen oxides thus corresponds to the curve "SCR lean conditions at 650° C." (line 310) in FIG. 3. A significant improvement is apparent in relation to the curve "SCR lean-rich conditions at 650° C." (line 320), (e.g., a higher proportion of nitrogen oxides is converted and the pollutant emissions are reduced).

Furthermore, the monitoring of the SCR catalytic converter 9 is simplified by the disclosure. This is because the ammonia storage capacity of the SCR catalytic converter 9 is typically monitored to supply an optimum quantity of urea solution to the SCR catalytic converter 9 and prevent an undesired release of ammonia. The ammonia storage capacity is predicted in this case on the basis of a model, which takes into consideration the supplied quantities of nitrogen oxides and ammonia. Moreover, the normal aging of the SCR catalytic converter 9 under lean conditions as a result of high temperatures and the presence of water is taken into consideration. A consideration of worsening of the SCR catalytic converter 9 as a result of the supply of a rich exhaust gas mixture is not provided, in contrast.

This results in a deviation of the actual ammonia storage capacity from the predicted ammonia storage capacity in the case of worsening as a result of a rich exhaust gas mixture. Because such a worsening is substantially prevented by the disclosure, the disclosure results in improved correspondence of the predicted and actual ammonia storage capacities. As a consequence, the supplied quantity of urea solution also corresponds more accurately to the desired quantity of urea solution and an undesired release of ammonia can be avoided.

FIG. 4 shows a schematic depiction of a hybrid vehicle system 406 that can derive propulsion power from engine system 408 and/or an on-board energy storage device. An energy conversion device, such as a generator, may be operated to absorb energy from vehicle motion and/or engine operation, and then convert the absorbed energy to an energy form suitable for storage by the energy storage device.

Engine system 408 may include an engine 410 having a plurality of cylinders 430. Engine 410 may be used similarly to engine 2 of FIG. 1 in one example. Engine 410 includes an engine intake 423 and an engine exhaust 425. The engine exhaust may be used similarly to the exhaust system 3 of FIG. 1. Engine intake 423 includes an air intake throttle 462 fluidly coupled to the engine intake manifold 444 via an intake passage 442. Air may enter intake passage 442 via air filter 452. Engine exhaust 425 includes an exhaust manifold 448 leading to an exhaust passage 435 that routes exhaust gas to the atmosphere. Engine exhaust 425 may include one or more emission control devices 470 mounted in a close-coupled position. The one or more emission control devices may include a three-way catalyst, lean $NO_x$ trap, diesel particulate filter, oxidation catalyst, etc. It will be appreciated that other components may be included in the engine such as a variety of valves and sensors, as further elaborated in herein. In some embodiments, wherein engine system 408 is a boosted engine system, the engine system may further include a boosting device, such as a turbocharger (not shown).

In one example, the emission control device 470 is a first emission control device arranged upstream of a second emission control device 472 relative to a direction of exhaust gas flow. The first emission control device 470 and the second emission control device 472 may be used similarly to LNT 5 and SCR 9 of FIG. 1, respectively, in one example. An oxygen storage component 474 may be arranged at a junction between the first emission control device 470 and the second emission control device 472. The oxygen storage component 474 may be shaped to store oxygen when there is an excess, such as in the presence of lean exhaust gas, and release the oxygen when exhaust gas is rich.

Vehicle system 406 may further include control system 414. Control system 414 is shown receiving information from a plurality of sensors 416 (various examples of which are described herein) and sending control signals to a plurality of actuators 481 (various examples of which are described herein). As one example, sensors 416 may include exhaust gas sensor 126 located upstream of the emission control device, temperature sensor 128, a lambda sensor 127 and pressure sensor 129. Other sensors such as additional pressure, temperature, air/fuel ratio, and composition sensors may be coupled to various locations in the vehicle system 406. As another example, the actuators may include the throttle 462.

In one example, the lambda sensor 127 and the exhaust gas sensor 126 are substantially identical. The lambda sensor 127 and the temperature sensor 128 are arranged between the first emission control device 470 and the oxygen storage component 474. In some examples, the lambda sensor 127 and the temperature sensor 128 may be deactivated such that feedback is not provided to the controller 412 in response to an exhaust gas air/fuel ratio sensed by the exhaust gas sensor 126 being greater than or equal to 1. However, feedback from the lambda sensor 127 and the temperature sensor 128 may be analyzed in response to the exhaust gas air/fuel ratio sensed by the exhaust gas sensor 126 being less than 1, as will be described in greater detail below.

Controller 412 may be configured as a conventional microcomputer including a microprocessor unit, input/output ports, read-only memory, random access memory, keep alive memory, a controller area network (CAN) bus, etc. Controller 412 may be used similarly to processing unit 11 of FIG. 1, in one example. Controller 412 may be configured as a powertrain control module (PCM). The controller may be shifted between sleep and wake-up modes for additional energy efficiency. The controller may receive input data from the various sensors, process the input data, and trigger the actuators in response to the processed input data based on instruction or code programmed therein corresponding to one or more routines.

In some examples, hybrid vehicle 406 comprises multiple sources of torque available to one or more vehicle wheels 459. In other examples, vehicle 406 is a conventional vehicle with only an engine, or an electric vehicle with only electric machine(s). In the example shown, vehicle 406 includes engine 410 and an electric machine 451. Electric machine 451 may be a motor or a motor/generator. A crankshaft of engine 410 and electric machine 451 may be connected via a transmission 454 to vehicle wheels 459 when one or more clutches 456 are engaged. In the depicted example, a first clutch 456 is provided between a crankshaft and the electric machine 451, and a second clutch 456 is provided between electric machine 451 and transmission 454. Controller 412 may send a signal to an actuator of each clutch 456 to engage or disengage the clutch, so as to connect or disconnect crankshaft from electric machine 451 and the components connected thereto, and/or connect or disconnect electric machine 451 from transmission 454 and the components connected thereto. Transmission 454 may be a gearbox, a planetary gear system, or another type of transmission. The powertrain may be configured in various manners including as a parallel, a series, or a series-parallel hybrid vehicle.

Electric machine 451 receives electrical power from a traction battery 461 to provide torque to vehicle wheels 459. Electric machine 451 may also be operated as a generator to provide electrical power to charge battery 461, for example during a braking operation.

Turning now to FIG. 5, it shows a method 500 for adjusting a rich engine operation in response to an exhaust gas temperature and an oxygen load of an oxygen storage component. Instructions for carrying out method 500 and the method 200 described above may be executed by a controller based on instructions stored on a memory of the controller and in conjunction with signals received from sensors of the engine system, such as the sensors described above with reference to FIG. 4. The controller (e.g., controller 412) may employ engine actuators of the engine system to adjust engine operation, according to the method described in the present disclosure.

The method 500 begins at 502, which includes determining, estimating, and/or measuring one or more current engine operating parameters. Current engine operating parameters may include but are not limited to throttle position, manifold vacuum, engine speed, vehicle speed, and air/fuel ratio.

The method 500 proceeds to 504, which includes determining if an engine air/fuel ratio is less than 1. The engine air/fuel ratio may correspond to an air/fuel ratio sensed between the engine and a most upstream exhaust aftertreatment device. In the example of FIG. 1, the engine air/fuel ratio may be sensed via the second lambda sensor 12. In the example of FIG. 4, the engine air/fuel ratio may be sensed via the exhaust gas sensor 126. Additionally or alternatively, the engine air/fuel ration may be estimated based on a commanded fuel injection and throttle position such that the second lambda sensor and/or exhaust gas sensor 126 may be omitted. If the engine air/fuel ratio is greater than or equal to 1, then the method 500 proceeds to 506 to maintain current engine operating parameters, which include the engine exhaust gas being stoichiometric or lean.

The method 500 proceeds to 508, which may include not monitoring (e.g., ignoring) an exhaust gas air/fuel ratio between a LNT and an SCR. In some examples, additionally or alternatively, this may further include ignoring a temperature of exhaust gas between the LNT and the SCR. Ignoring and/or not monitoring the air/fuel ratio may include not analyzing feedback from a corresponding sensor and/or deactivating the sensor such that the exhaust gas may not be sensed. The air/fuel ratio may be ignored due to the current engine operating parameters comprising a stoichiometric and/or lean air/fuel ratio. As such, rich exhaust gas may not be present between the LNT and the SCR. In one example, this may include deactivating the first lambda sensor 6 and the temperature sensor 7 described above with respect to FIG. 1. By doing this, resource ordinarily used to operate these devices may be conserved.

The method 500 proceeds to 510, which may include not estimating an oxygen storage load of an oxygen storage component arranged between the LNT and the SCR. In this way, the method 500 may increase fuel economy by not characterizing the oxygen storage component and exhaust gases between the LNT and the SCR when the engine air/fuel ratio is greater than or equal to 1.

Returning to 504, if the engine air/fuel ratio is less than 1 (e.g., the engine is operating rich), then the method 500 proceeds to 512 to determine if the exhaust gas air/fuel ratio is less than 1 at the lambda sensor arranged between the LNT and the oxygen storage component. If the air/fuel ratio at the lambda sensor is still greater than or equal to 1, then the method 500 proceeds to 514, which may include continuing to monitor the air/fuel ratio between the LNT and the oxygen storage component. As described above, a transport delay may be present between the engine air/fuel ratio being rich and the exhaust gas air/fuel ratio being rich due to regeneration of the LNT, a volume of the exhaust passage, and distance between the first and second lambda sensors. The lambda breakthrough, which indicates if the LNT has initiated regeneration, may signify that the air/fuel ratio between the LNT and the oxygen storage component is rich (e.g., less than 1).

If the air/fuel ratio at the lambda sensor is less than 1, indicating the exhaust gas is rich, then the method 500 proceeds to 516, which may include determining if an exhaust gas temperature is greater than a limit temperature. As described above and shown with respect to FIG. 3, the limit temperature may be a non-zero value at which the SCR catalyst experiences a decrease in nitrogen oxide conversion efficiency in the presence of rich exhaust gas. In one example, the limit temperature is 500° C. The exhaust gas temperature may be sensed via a temperature sensor, such as temperature sensor 7 of FIG. 1 or temperature sensor 128 of FIG. 4. At any rate, the exhaust gas temperature sensed may provide an indication of a temperature of exhaust gas flowing to the SCR device. If the exhaust gas temperature is not greater than the limit temperature (e.g., the exhaust gas temperature is less than or equal to the limit temperature), then the method 500 proceeds to 518, which may include continuing to operate the engine rich while ignoring an oxygen storage load. Exhaust gas with a temperature less than or equal to the limit temperature may not degrade the SCR catalyst, even if the exhaust gas is rich. As such, the rich engine operation may not be limited via an oxygen load of the oxygen storage component when the exhaust gas temperature is less than or equal to the limit temperature. In this way, the oxygen storage load of the oxygen storage component may be ignored. Said another way, the rich operation at 518 may be independent of and uninterrupted by the oxygen storage load of the oxygen storage component.

If the exhaust gas temperature is greater than the limit temperature, then the method 500 proceeds to 520, which may include limiting rich operation of the engine based on an oxygen storage load of the oxygen storage component. The oxygen storage load may be estimated via data stored in lookup tables. For example, one table may correspond to oxygen consumed from the oxygen storage component and one table may correspond to oxygen received by the oxygen storage component. Output from the two tables may be combined to provide an estimation of a current oxygen storage load of the oxygen storage component. Additionally or alternatively, the oxygen storage load may be tracked over time based on the air/fuel ratio at the first lambda sensor and the temperature sensed at the temperature sensor. As the current oxygen storage load increases, the limit on the rich engine operation may decrease such that the rich engine operation may be longer (e.g., span a greater duration of time) than a rich engine operation where the oxygen storage load is less. In one example, the limit may include a time duration, wherein the time duration represents an amount of time left for the rich engine operation to proceed under current operating parameters based on a difference between the current oxygen storage load and a threshold load. The time duration may increase as the difference between the current oxygen storage load and the threshold load increases.

The method 500 proceeds to 522, which may include determining if the current oxygen storage load is less than or equal to the threshold load. The threshold load may be based on a non-zero value. Additionally or alternatively, the threshold load may represent an oxygen storage load of the oxygen storage component that may sufficiently dilute (e.g., lean) a rich exhaust gas flow remaining in the exhaust passage following switching the engine operation from the rich operation to a lean operation. That is to say, if the engine operation is switched from the rich operation to the lean operation, exhaust gases in the exhaust passage and between the LNT and the SCR may not instantaneously become lean due to the transport delay and time needed to adjust the engine to a lean operation. As such, the threshold load may compensate for an estimated amount of rich exhaust gas still present in the exhaust passage to mitigate exposure of the SCR to hot, rich exhaust gas. In this way, the threshold load may provide a sufficient amount of oxygen in the oxygen storage component to convert rich exhaust gases remaining in the exhaust passage until lean exhaust gas from the engine flows downstream of the LNT.

Said another way, the threshold load may be based on a load such that oxygen is still stored in the oxygen storage component following the time duration of the rich operation reaching zero. Thus, even though the rich operation is switched to the lean operation when or close to when the time duration reaches zero, the oxygen storage component may still dilute rich exhaust gases following the switch and may continue to do so until the transport delay is complete.

If the oxygen storage load is not less or equal to than the threshold load (e.g., the oxygen storage load is greater than the threshold load), then the method 500 proceeds to 524 to maintain rich engine operation. The oxygen storage load may continuously be monitored and compared against the threshold load.

If the oxygen storage load is less than or equal to the threshold load, then the method 500 proceeds to 526, which may include adjusting engine operating parameters to lean engine operating parameters. As such, the rich engine operation is deactivated to block hot, rich exhaust gas flow to the SCR. The engine operation may be switched to a lean operation to replenish the oxygen storage load of the oxygen storage component.

In one example, if a LNT regeneration is occurring, and the LNT regeneration is prematurely terminated due to the oxygen storage load being less than the threshold load, then the LNT regeneration may be reinitiated once the oxygen storage load is greater than the threshold load if LNT regeneration is still desired. As such, the LNT regeneration, which includes an exhaust gas temperature being greater than the limit temperature, may be executed piecewise to mitigate exposure of hot, rich exhaust gases to the SCR. Additionally or alternatively, if the LNT regeneration was prematurely terminated and the engine operation is switched from rich to lean to replenish the oxygen storage component, then the LNT regeneration may be reinitiated prior to the oxygen storage load of the oxygen storage component exceeding the threshold load if an exhaust gas temperature falls below the limit temperature during the lean operation. As such, the engine operation may be switched back to rich to complete the LNT regeneration without waiting for the oxygen storage load to exceed the threshold load.

Turning now to FIG. 6, it shows a graph 600 of an engine operating sequence illustrating a plurality of conditions in an exhaust gas arrangement. Plot 610 illustrates feedback from a second lambda sensor and small dashed line 612 illustrates a stoichiometric lambda value, plot 620 illustrates feedback from a first lambda sensor, small dashed line 622 illustrates a stoichiometric lambda value, and large dashed line 624 illustrates an air/fuel ratio of exhaust gas reaching the SCR catalyst, plot 630 illustrates a temperature of exhaust gas and small dashed line 632 illustrates a limit temperature, plot 640 illustrates an oxygen storage load of an oxygen storage component and small dashed line 642 illustrates a threshold load, and plot 650 illustrates a time remaining for a rich engine operation to continue based on the oxygen storage load. Large dashes are bigger than small dashes. Furthermore, large dashed line 624 may not represent feedback from an exhaust gas sensor such as a lambda sensor, but may be illustrative to represent a shift in exhaust gas composition from the first lambda sensor to the SCR catalyst. In one example, the second lambda sensor is identical to the second lambda sensor 12 of FIG. 1 and the first lambda sensor is identical to the first lambda sensor 6 of FIG. 1. As such, the second lambda sensor is upstream of the first lambda sensor. Time increases from a left to a right side of the figure.

Prior to t1, the second lambda sensor (plot 610) indicates an engine air/fuel ratio to be greater than a stoichiometric air/fuel ratio (small dashed line 612), thereby indicating that an engine operation is a lean engine operation. As such, a LNT regeneration or other engine operation is not being executed. The first lambda sensor feedback (plot 620) is substantially equal to the second lambda sensor feedback. The exhaust gas temperature (plot 630) is less than the limit temperature (dashed line 632). The oxygen storage load (plot 640) increases to a load further above the threshold load (642). The time remaining is not indicated prior to t1 since the engine is not operating rich. At t1, the engine operation may switch from a lean operation to a rich operation. In one example, the operation is switched in response to a request to regenerate the LNT.

Between t1 and t2, the second lambda sensor feedback decreases as rich exhaust gases reach the second lambda sensor. The first lambda sensor feedback remains greater than 1 as rich exhaust gases have not yet reached the first lambda sensor. Said another way, a lambda breakthrough has not yet occurred. The exhaust gas temperature continues to rise while remaining below the limit temperature. The oxygen storage load continues to rise as exhaust gas in the area of the oxygen storage load is still lean. At t2, the rich exhaust gas reaches the first lambda sensor and its lambda value drops to less than 1.

Between t2 and t3, the oxygen storage load begins to decrease as rich exhaust gas flows therethrough, releasing oxygen captured by the oxygen storage component. As such, the exhaust gas reaching the SCR catalyst (large dashed line 624) is lean, even though the engine operation is rich due to the oxygen released by the oxygen storage component. However, it is not demanded that the exhaust gas flowing to the SCR device be leaned as the exhaust temperature is still less than the limit temperature. As such, the rich engine operation may not be limited (e.g., a time remaining is not determined), even though the oxygen storage load decreases to a load less than the threshold load between t2 and t3. The exhaust gas temperature continues to increase toward the limit temperature. At t3, the exhaust gas reaching the SCR catalyst becomes richer as the oxygen storage load is relatively low (e.g., 0). The rich operation is switched back to a lean operation.

Between t3 and t4, the second lambda sensor feedback increases to a value greater than 1, indicating exhaust gas is lean. The first lambda sensor feedback increases to a value greater than 1 closer to time t4 than the second lambda sensor due to the transport delay. The oxygen storage load begins to increase in conjunction with the first lambda sensor feedback increasing as the oxygen storage component captures and stores excess oxygen from the lean exhaust gas flow. This may be due to the exhaust passage still comprising rich exhaust gas even after the engine operation is switched to the lean operation. The exhaust gas temperature continues to increase toward the limit temperature. At t4, the exhaust gas temperature exceeds the limit temperature. Additionally, the engine operation is shifted from the lean operation to a rich operation.

Between t4 and t5, the second lambda sensor value drops to a value less than 1, indicating engine exhaust gas is rich. The first lambda sensor value decreases at a later time between t4 and t5, closer to t5, than the second lambda sensor value. As such, the oxygen storage load may continue to increase as lean exhaust gas is still in the presence of the oxygen storage component. The exhaust gas temperature remains above the limit temperature. At t5, the first lambda sensor value decreases to a value less than 1, thereby indicated a lambda breakthrough of the LNT and rich exhaust gas flowing toward the SCR. The oxygen storage load begins to decrease as reductants in the rich exhaust gas release the stored oxygen in the oxygen storage component. The time remaining is estimated based on the oxygen storage load.

Between t5 and t6, the oxygen storage load and the time remaining continue to decrease as the rich engine operation continues. As shown, the oxygen released from the oxygen storage component increases the air/fuel ratio of the exhaust gas reaching the SCR catalyst to a lambda value greater than 1, even though rich exhaust gas is measured by the first lambda sensor. In this way, hot, rich exhaust gas may not flow to the SCR, wherein hot, rich exhaust gas comprises a temperature greater than the limit temperature and a sensed lambda value of less than 1.

At t6 and between t6 and t7, the time remaining and the oxygen storage load continue to decrease. The oxygen storage load remains above the threshold load. The exhaust gas temperature remains higher than the limit temperature.

In one example, if the exhaust gas temperature were to fall below the limit temperature, then the time remaining would be ignored and the rich engine operation may proceed without being limited by the oxygen storage load.

At t7, the oxygen storage load is substantially equal to the threshold load and the time remaining is substantially equal to 0 while the exhaust gas temperature is still greater than the limit temperature. As such, the engine operation is switched from the rich operation to a lean operation. Between t7 and t8, the second lambda value increases to a values greater than 1. However, the first lambda sensor value remains below 1 as lean exhaust gas has not yet reached the first lambda sensor. As such, the oxygen storage load continues to decrease to a load less than the threshold load. However, exhaust gas flowing to the SCR is still lean. This may be due to the threshold load being equal to a load compensating for a delay, wherein the delay is based on the engine switching from rich to lean and lean exhaust gas reaching the SCR. In this way, the threshold load may be a buffer. In one example, the threshold load may increase as a distance between the SCR and the engine increase.

At t8, the first lambda sensor value is a value greater than 1, indicating lean exhaust gas is flowing to the SCR. The oxygen storage load begins to increase from a relatively low load (e.g., zero). After t8, the lean operation continues. The oxygen storage load continues to increase and increases to a load greater than the threshold load. Although not illustrated, the engine operation may be returned to a rich operation, if still desired, following the oxygen storage load exceeding the threshold load. In this way, if the engine operation was rich to regenerate the LNT, the LNT regeneration may continue following t8.

In this way, rich engine operation may be adjusted in response to an exhaust gas temperature and an amount of oxygen stored in an oxygen storage component. The rich engine operation may be limited and/or executed for a fixed duration of time if the exhaust gas temperature is above a limit temperature, wherein the duration of time is based on an estimated amount of time in which the amount of oxygen stored will be less than or equal to a threshold load. The technical effect of limiting the rich engine operation is to decrease an amount of hot, rich exhaust gas flowing to an SCR catalyst downstream of a LNT. By doing this, degradation to the SCR catalyst may be mitigated.

In another representation, an arrangement having an internal combustion engine producing an exhaust gas stream and an exhaust system connected to the internal combustion engine for receiving the exhaust gas stream, the exhaust system comprising an LNT catalytic converter, a first lambda sensor arranged downstream of the LNT catalytic converter, a temperature sensor arranged downstream of the LNT catalytic converter, an oxygen storage component arranged downstream of the first lambda sensor and downstream of the temperature sensor, and an SCR catalytic converter arranged downstream of the oxygen storage component.

A first example of the arrangement further comprises where the exhaust system furthermore comprises a processing unit, which is configured and designed for the purpose of ascertaining an oxygen quantity stored in the oxygen storage component via sensor signals of the first lambda sensor and the temperature sensor.

A second example of the arrangement, optionally including the first example, further includes where the exhaust system furthermore comprises a control unit, which is configured and designed for the purpose of outputting a control signal for controlling the combustion air ratio $\lambda_M$ of the exhaust gas stream leaving the internal combustion engine as a function of the stored oxygen quantity.

A third example of the arrangement, optionally including the first and/or second examples, further includes where the control unit is configured and designed for the purpose of outputting the control signal for controlling the combustion air ratio $\lambda_M$ of the exhaust gas stream leaving the internal combustion engine as a function of the temperature of the exhaust gas stream.

A fourth example of the arrangement, optionally including one or more of the first through third examples, further includes where exhaust system furthermore comprises a second lambda sensor arranged upstream of the LNT catalytic converter.

A fifth example of the arrangement, optionally including one or more of the first through fourth examples, further includes where the exhaust system furthermore comprises a supply device for supplying an agent forming ammonia to the exhaust gas stream.

A sixth example of the arrangement, optionally including one or more of the first through fifth examples, further includes where the oxygen storage component contains one or more compounds selected from a group comprising $CeO_2$, $PrO_2$, $ZrO_2$, $MnO_x$, $La_2O_3$, $YO_2$, $NbO_x$, $VO_x$, $CrO_x$, $FeO_x$, $CuO$, $AgO_x$, Pt, and Pd.

In another representation, a method for treating an exhaust gas stream of the arrangement produced by an internal combustion engine, comprises conducting the exhaust gas stream through an LNT catalytic converter, ascertaining the combustion air ratio $\lambda_1$ in the exhaust gas stream downstream of the LNT catalytic converter and upstream of an oxygen storage component, ascertaining the temperature of the exhaust gas stream downstream of the LNT catalytic converter and upstream of the oxygen storage component, conducting the exhaust gas stream through the oxygen storage component, and conducting the exhaust gas stream through an SCR catalytic converter downstream of the oxygen storage component.

A first example of the method further comprises determining an oxygen quantity stored in the oxygen storage component via the ascertained combustion air ratio $\lambda_1$ and the ascertained temperature.

A second example of the method, optionally including the first example, further includes controlling the combustion air ratio $\lambda_M$ of the exhaust gas stream leaving the internal combustion engine as a function of the determined oxygen quantity.

A third example of the method, optionally including the first and/or second examples, further includes where the combustion air ratio $\lambda_M$ of the exhaust gas stream leaving the internal combustion engine is controlled such that the exhaust gas stream has a combustion air ratio $\lambda_M \geq 1$ if the determined oxygen quantity falls below a limiting value.

A fourth example of the method, optionally including one or more of the first through third examples, further includes where the combustion air ratio $\lambda_M$ of the exhaust gas stream leaving the internal combustion engine is only controlled such that the exhaust gas stream has a combustion air ratio $\lambda_M \geq 1$ if the determined oxygen quantity falls below a limiting value and the temperature of the exhaust gas stream exceeds a limit temperature.

A fifth example of the method, optionally including one or more of the first through fourth examples, further includes determining the combustion air ratio $\lambda_2$ in the exhaust gas stream upstream of the LNT catalytic converter.

In one embodiment, a system comprises an exhaust passage comprising a lean-$NO_x$ trap (LNT) arranged upstream of a selective-catalytic-reduction (SCR) catalyst with respect to a direction of exhaust gas flow, an oxygen storage component arranged between the LNT and the SCR, and a controller with computer-readable instructions stored thereon that when executed enable the controller to limit a rich operation of an engine in response to an exhaust temperature and an oxygen load of the oxygen storage component. A first example of the system, further includes where an exhaust gas temperature sensor and a lambda sensor arranged between the LNT and the oxygen storage component. A second example of the system optionally including the first example, further includes where the lambda sensor is a first lambda sensor, and where a second lambda sensor is arranged upstream of the LNT. A third example of the system, optionally including the first and/or second examples, further includes where the instructions further enable the controller to ignore feedback from the first lambda sensor and the exhaust gas temperature sensor in response to a lambda value of the second lambda sensor being greater than or equal to 1. A fourth example of the system, optionally including one or more of the first through third examples, further includes where the instruction further enable the controller estimate a time remaining of the rich operation based on the oxygen load, and where the time remaining increases as the oxygen load increases. A fifth example of the system, optionally including one or more of the first through fourth examples, further includes where the instructions further enable the controller to switch the rich operation to a lean operation in response to the oxygen load decreasing to a threshold load, and where the rich operation is subsequently reinstated in response to the oxygen load increasing above the threshold load. A sixth example of the system, optionally including one or more of the first through fifth examples, further includes where the rich operation is executed independent of the oxygen load in response to the exhaust gas temperature being less than a limit temperature, wherein the limit temperature is equal to 500° C.

An embodiment of a method comprises switching from a rich operation to a lean operation in response to an exhaust gas temperature being greater than or equal to a limit temperature and an oxygen load of an oxygen storage component is less than or equal to a threshold load, wherein the oxygen storage component is arranged downstream of a first catalyst and upstream of a second catalyst relative to a direction of exhaust gas flow. A first example of the method further includes where the first catalyst is a lean-$NO_x$ trap and the second catalyst is a selective-catalytic reduction catalyst. A second example of the method, optionally including the first example, further includes where the exhaust gas temperature is sensed via a temperature sensor arranged between the first catalyst and the oxygen storage component, and where the rich operation is maintained and operated independently of the oxygen load in response to the exhaust gas temperature being less than the limit temperature. A third example of the method, optionally including the first and/or second examples, further includes switching from the lean operation to the rich operation in response to the rich operation being desired when the oxygen load exceeds the threshold load or the exhaust temperature falling below the limit temperature. A fourth example of the method, optionally including one or more of the first through third examples, further includes where the rich operation is desired in response to a first catalyst regeneration request. A fifth example of the method, optionally including one or more of the first through fourth examples, further includes ignoring feedback from a first lambda sensor and a temperature sensor arranged between the first catalyst and the oxygen storage component in response to an engine air/fuel ratio measured via a second lambda sensor upstream of the first catalyst being greater than or equal to 1. A sixth example of the method, optionally including one or more of the first through fifth examples, further includes where the oxygen load is not estimated in response to the engine air/fuel ratio being greater than or equal to 1. A seventh example of the method, optionally including one or more of the first through sixth examples, further includes during the rich operation, estimating a time remaining until the oxygen load is less than or equal to the threshold load, and where the time remaining is ignored if the exhaust gas temperature is less than the limit temperature, and where the time remaining is initiated in response to the air/fuel ratio measured by the first lambda sensor being less than 1.

An embodiment of an engine exhaust arrangement comprises an exhaust passage comprising a lean-$NO_x$ trap (LNT) upstream of a selective-catalytic reduction (SCR) catalyst relative to a direction of exhaust gas flow, an oxygen storage component arranged between the LNT and the SCR catalyst, a first lambda sensor arranged between the LNT and the oxygen storage component, a temperature sensor arranged between the LNT and the oxygen storage component, a second lambda sensor arranged upstream of the LNT, and a controller with computer-readable instruction stored on non-transitory memory thereof that when executed enable the controller to ignore feedback from the first lambda sensor and the temperature sensor in response to a lambda value sensed by the second lambda sensor being greater than or equal to 1, monitor feedback from the first lambda sensor and the temperature sensor in response to a lambda value sensed by the second lambda sensor being less than 1, wherein in response to a lambda value from the first lambda sensor being less than 1 and an exhaust temperature sensed by the temperature sensor being greater than a limit temperature, a rich operation of an engine is limited to a time remaining estimated based on an oxygen load of the oxygen storage component. A first example of the exhaust gas arrangement further includes where the oxygen storage component releases oxygen during the rich operation when the lambda value from the first lambda sensor being less than 1, and where a time remaining for the rich operation is estimated based on a difference between a current oxygen load of the oxygen storage component and a threshold load. A second example of the exhaust gas arrangement, optionally including the first example, further includes where the time remaining is zero simultaneously with the current oxygen load being equal to the threshold load, and where the instructions further allow the controller to switch from the rich operation to a lean operation in response to time remaining being equal to zero, and where the lean operation is switched back to the rich operation in response to the oxygen load exceeding the threshold load and a request for the rich operation being present. A third example of the exhaust gas arrangement, optionally including the first and/or second examples, further includes where the instructions further enable the controller to ignore an oxygen load of the oxygen storage component in response to the exhaust gas temperature being less than the limit temperature. A fourth example of the exhaust gas arrangement, optionally including one or more of the first through third examples, further includes where the rich operation is in response to a LNT regeneration request, and where a LNT regeneration proceeds uninterruptedly in response to the exhaust gas temperature being less than the limit temperature.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system comprising:
  an exhaust passage comprising a lean-$NO_x$ trap (LNT) arranged upstream of a selective-catalytic-reduction (SCR) catalyst with respect to a direction of exhaust gas flow;
  an oxygen storage component arranged between the LNT and the SCR catalyst; and
  a controller with computer-readable instructions stored thereon that when executed cause the controller to:
    limit a rich operation of an engine in response to an exhaust temperature and an oxygen load of the oxygen storage component.

2. The system of claim 1, further comprising an exhaust gas temperature sensor and a lambda sensor arranged between the LNT and the oxygen storage component.

3. The system of claim 2, further comprising where the lambda sensor is a first lambda sensor, and where a second lambda sensor is arranged upstream of the LNT.

4. The system of claim 3, wherein the instructions further enable the controller to ignore feedback from the first lambda sensor and the exhaust gas temperature sensor in response to a lambda value of the second lambda sensor being greater than or equal to 1.

5. The system of claim 1, wherein the instruction further cause the controller estimate a time remaining of the rich operation based on the oxygen load, and where the time remaining increases as the oxygen load increases.

6. The system of claim 1, wherein the instructions further cause the controller to switch the rich operation to a lean operation in response to the oxygen load decreasing to a threshold load, and where the rich operation is subsequently reinstated in response to the oxygen load increasing above the threshold load.

7. The system of claim 1, wherein the rich operation is executed independent of the oxygen load in response to the exhaust gas temperature being less than a limit temperature, wherein the limit temperature is equal to 500° C.

8. A method comprising:
  switching from a rich operation to a lean operation in response to an exhaust gas temperature being greater than or equal to a limit temperature and an oxygen load of an oxygen storage component being less than or equal to a threshold load; wherein
  the oxygen storage component is arranged downstream of a first catalyst and upstream of a second catalyst relative to a direction of exhaust gas flow.

9. The method of claim 8, wherein the first catalyst is a lean-$NO_x$ trap and the second catalyst is a selective-catalytic reduction catalyst.

10. The method of claim 8, wherein the exhaust gas temperature is sensed via a temperature sensor arranged between the first catalyst and the oxygen storage component, and where
  the rich operation is maintained and operated independently of the oxygen load in response to the exhaust gas temperature being less than the limit temperature.

11. The method of claim 8, further comprising switching from the lean operation to the rich operation in response to the rich operation being desired when the oxygen load exceeds the threshold load or the exhaust temperature falling below the limit temperature.

12. The method of claim 11, wherein the rich operation is desired in response to a first catalyst regeneration request.

13. The method of claim 8, further comprising ignoring feedback from a first lambda sensor and a temperature sensor arranged between the first catalyst and the oxygen storage component in response to an engine air/fuel ratio measured via a second lambda sensor upstream of the first catalyst being greater than or equal to 1.

14. The method of claim 13, wherein the oxygen load is not estimated in response to the engine air/fuel ratio being greater than or equal to 1.

15. The method of claim 13, further comprising during the rich operation, estimating a time remaining until the oxygen load is less than or equal to the threshold load, and where the time remaining is ignored if the exhaust gas temperature is less than the limit temperature, and where the time remaining is initiated in response to the air/fuel ratio measured by the first lambda sensor being less than 1.

16. An engine exhaust arrangement comprising:
an exhaust passage comprising a lean-$NO_x$ trap (LNT) upstream of a selective-catalytic reduction (SCR) catalyst relative to a direction of exhaust gas flow;
an oxygen storage component arranged between the LNT and the SCR catalyst;
a first lambda sensor arranged between the LNT and the oxygen storage component;
a temperature sensor arranged between the LNT and the oxygen storage component;
a second lambda sensor arranged upstream of the LNT; and
a controller with computer-readable instruction stored on non-transitory memory thereof that when executed cause the controller to:
ignore feedback from the first lambda sensor and the temperature sensor in response to a lambda value sensed by the second lambda sensor being greater than or equal to 1;
monitor feedback from the first lambda sensor and the temperature sensor in response to a lambda value sensed by the second lambda sensor being less than 1; wherein
in response to a lambda value from the first lambda sensor being less than 1 and an exhaust temperature sensed by the temperature sensor being greater than a limit temperature, a rich operation of an engine is limited to a time remaining estimated based on an oxygen load of the oxygen storage component.

17. The engine exhaust arrangement of claim 16, wherein the oxygen storage component releases oxygen during the rich operation when the lambda value from the first lambda sensor being less than 1, and where a time remaining for the rich operation is estimated based on a difference between a current oxygen load of the oxygen storage component and a threshold load.

18. The engine exhaust arrangement of claim 17, wherein the time remaining is zero simultaneously with the current oxygen load being equal to the threshold load, and where the instructions further cause the controller to switch from the rich operation to a lean operation in response to time remaining being equal to zero, and where the lean operation is switched back to the rich operation in response to the oxygen load exceeding the threshold load and a request for the rich operation being present.

19. The engine exhaust arrangement of claim 16, wherein the instructions further cause the controller to ignore an oxygen load of the oxygen storage component in response to the exhaust gas temperature being less than the limit temperature.

20. The engine exhaust arrangement of claim 16, wherein the rich operation is in response to a LNT regeneration request, and where a LNT regeneration proceeds uninterruptedly in response to the exhaust gas temperature being less than the limit temperature.

* * * * *